(12) United States Patent
Shoji

(10) Patent No.: US 9,727,789 B2
(45) Date of Patent: Aug. 8, 2017

(54) INFORMATION PROCESSING APPARATUS AND CONTROL METHOD THEREOF

(71) Applicant: CANON KABUSHIKI KAISHA, Tokyo (JP)

(72) Inventor: Ryota Shoji, Kawasaki (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 22 days.

(21) Appl. No.: 15/004,307

(22) Filed: Jan. 22, 2016

(65) Prior Publication Data

US 2016/0219212 A1 Jul. 28, 2016

(30) Foreign Application Priority Data

Jan. 23, 2015 (JP) ................................ 2015-011684

(51) Int. Cl.
*G06K 9/00* (2006.01)
*H04N 5/232* (2006.01)

(52) U.S. Cl.
CPC ..... *G06K 9/00765* (2013.01); *H04N 5/23212* (2013.01); *H04N 5/23293* (2013.01)

(58) Field of Classification Search
None
See application file for complete search history.

(56) References Cited

U.S. PATENT DOCUMENTS

| 2009/0142041 A1* | 6/2009 | Nagasawa | H04N 13/0033 386/341 |
| 2010/0128145 A1* | 5/2010 | Pitts | H04N 5/23212 348/231.99 |
| 2012/0057852 A1* | 3/2012 | Devleeschouwer | G11B 27/034 386/278 |
| 2014/0064710 A1* | 3/2014 | Ikeda | H04N 5/91 386/338 |
| 2014/0240463 A1* | 8/2014 | Pitts | H04N 5/23212 348/46 |

FOREIGN PATENT DOCUMENTS

JP 2014-011574 A 1/2014

* cited by examiner

*Primary Examiner* — Shahbaz Nazrul
(74) *Attorney, Agent, or Firm* — Cowan, Liebowitz & Latman, P.C.

(57) ABSTRACT

An information processing apparatus comprises an obtaining unit configured to obtain a moving image in which each frame is constituted by an image having a plurality of pieces of light field information, and a setting unit configured to set a focus distance for each frame of the moving image, wherein the setting unit displays a range of settable focus distances for each frame of the moving image.

12 Claims, 13 Drawing Sheets

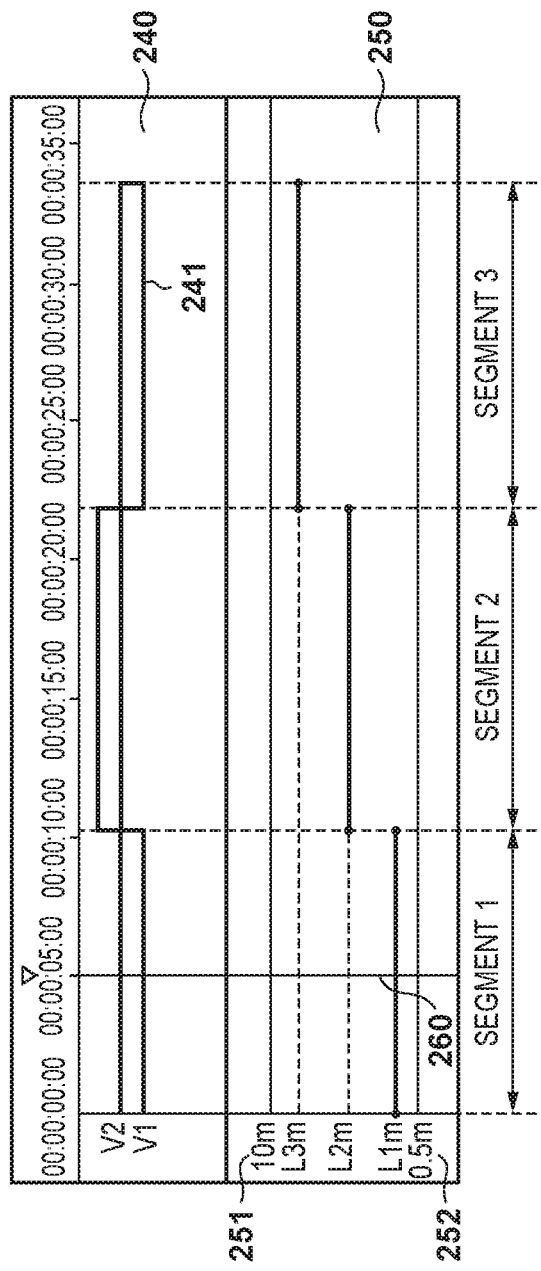

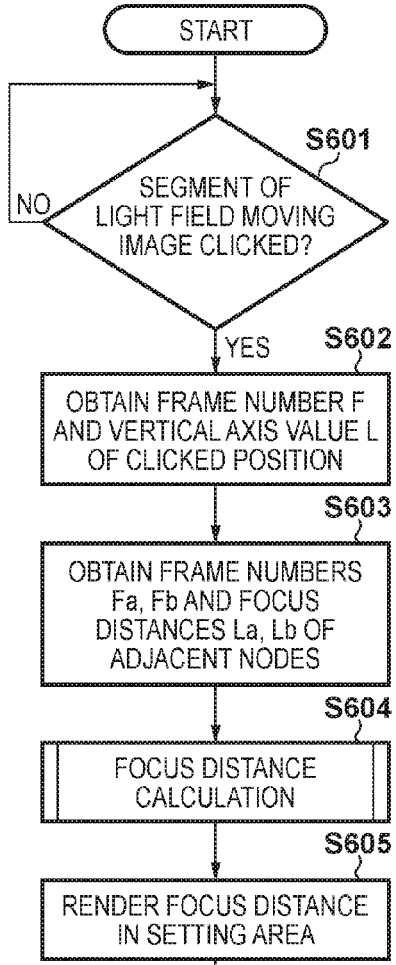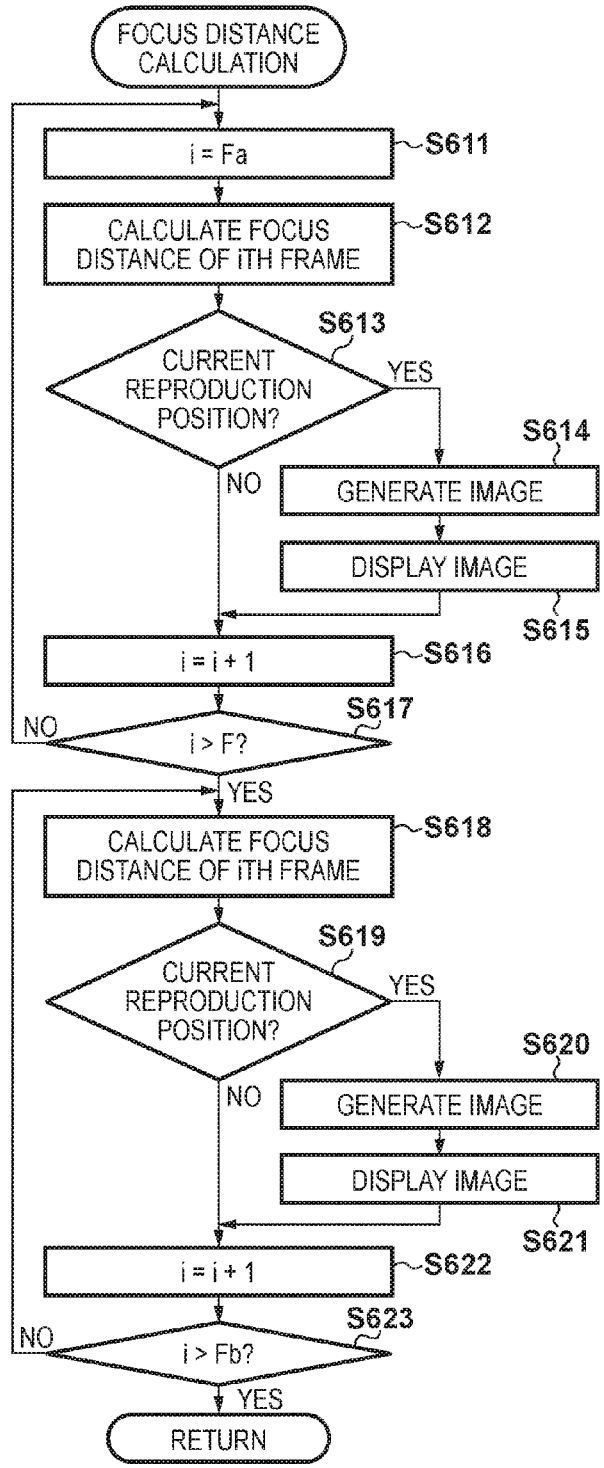

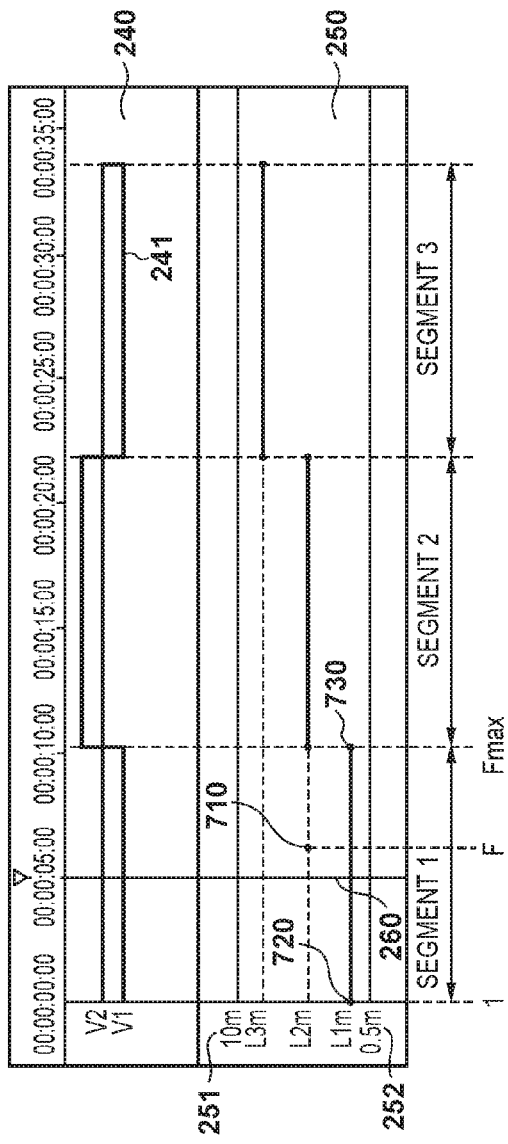
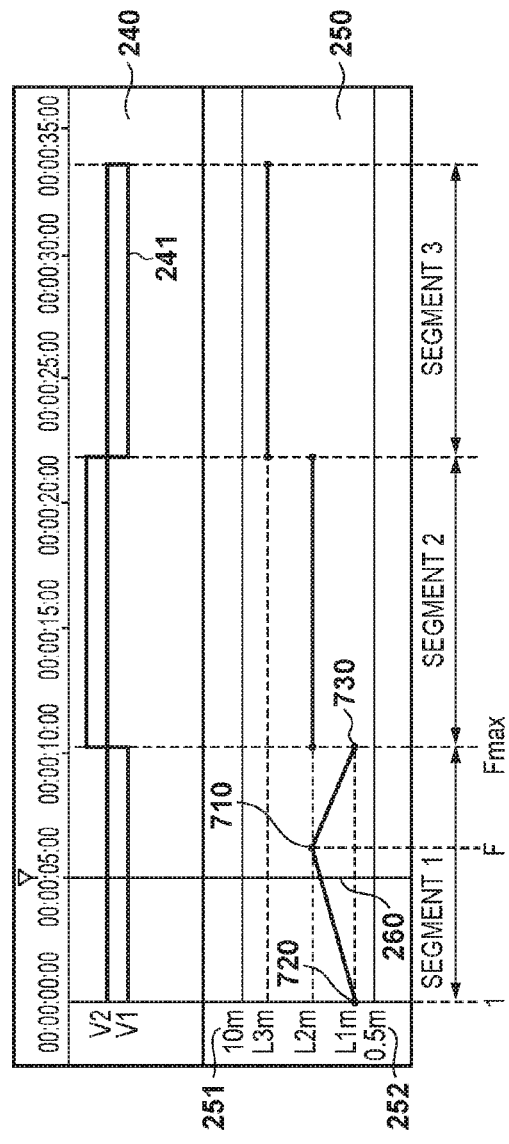

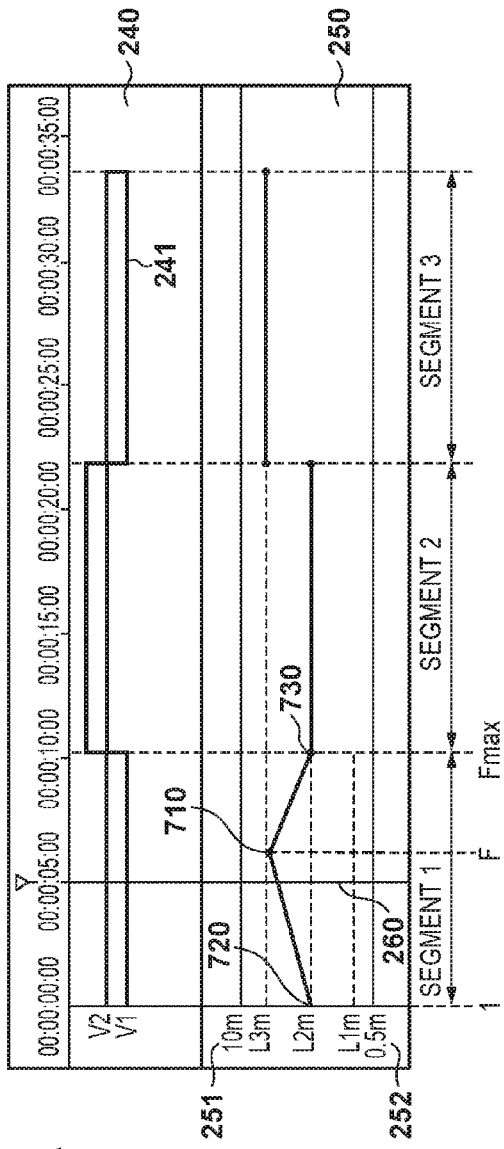
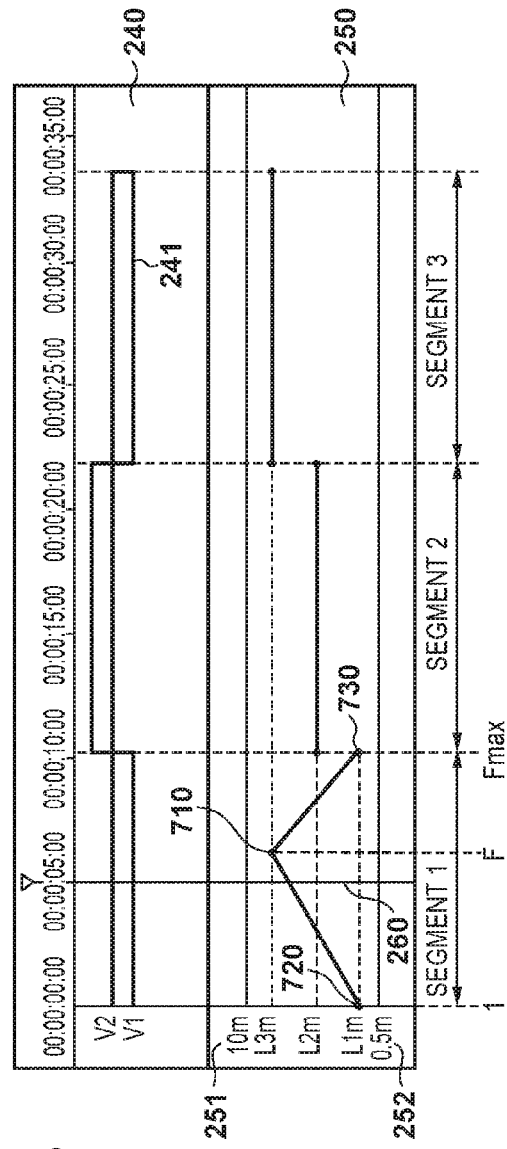
FIG. 8A
FIG. 8B

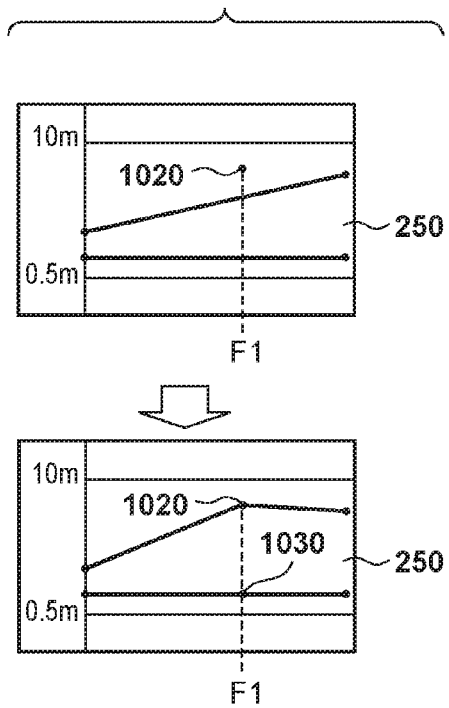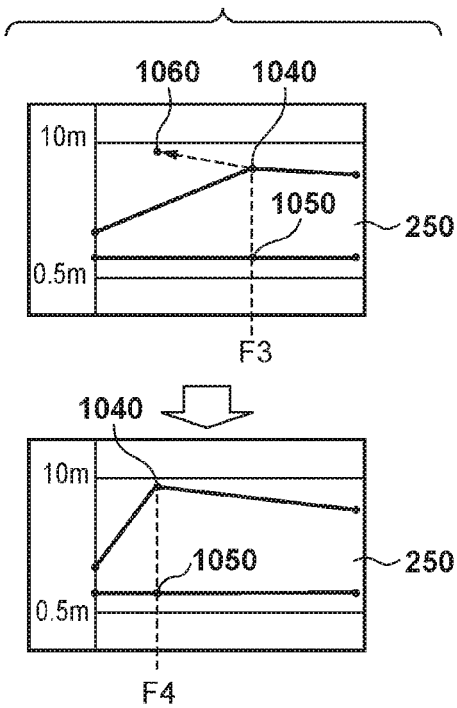

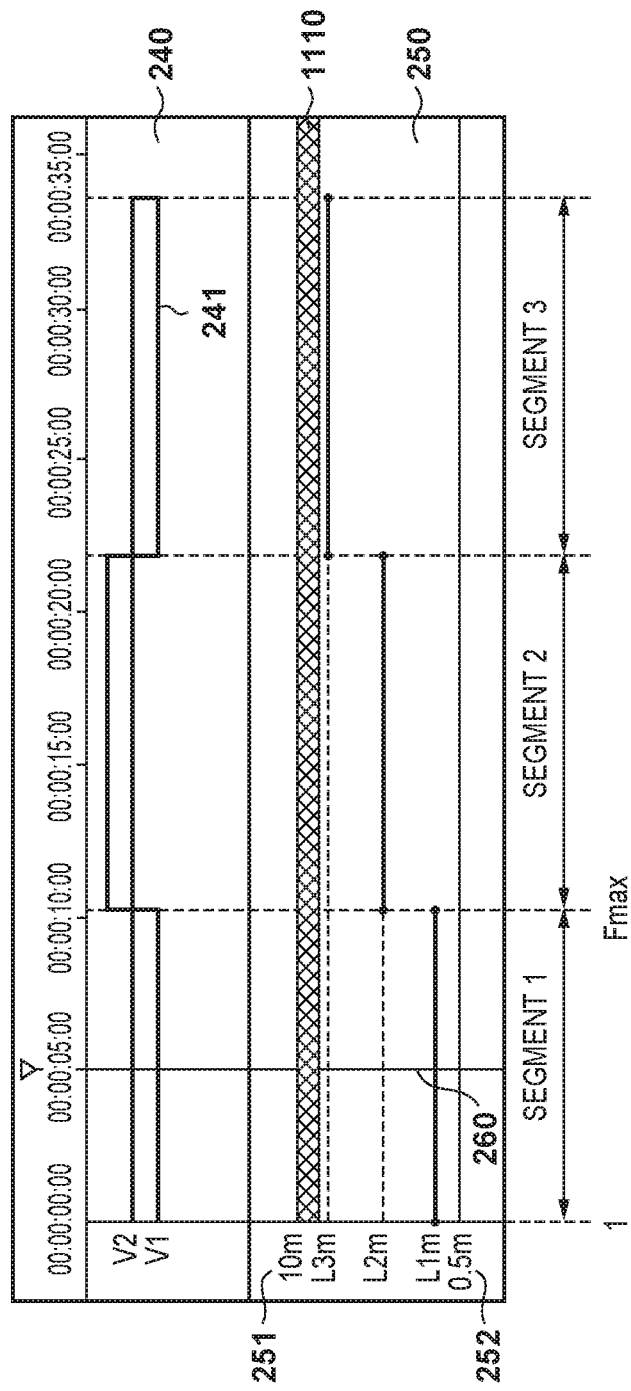

INFORMATION PROCESSING APPARATUS AND CONTROL METHOD THEREOF

BACKGROUND OF THE INVENTION

Field of the Invention

The present invention relates to techniques for editing an image in which an in-focus position can be set as desired after the image has been shot.

Description of the Related Art

An image capturing apparatus called a light field camera has been garnering attention in recent years. In addition to having an image capturing lens, the light field camera has a microlens array disposed on a surface of an image sensor, and light field information (light field data) indicating a travel direction of light is recorded along with an intensity of the light received by the image sensor. An image shot by a light field camera (a light field image) can on the basis of that light field data produce an image in which a desired position is in focus.

Japanese Patent Laid-Open No. 2014-011574 discloses generating a moving image that uses light field images as frames (a light field moving image), and determining an in-focus position (focus distance) in each frame of the light field moving image through user operations.

However, according to Japanese Patent Laid-Open No. 2014-011574, it is not easy to make fine adjustments to the focus distance in each frame of the light field moving image, and it has been difficult to visually confirm changes in the focus distance as time passes in the moving image.

SUMMARY OF THE INVENTION

The present invention has been made in consideration of the aforementioned problems, and realizes a technique that enables a focus distance in a frame at any desired time to be set with ease in a moving image in which an in-focus position can be set as desired in each frame after shooting.

In order to solve the aforementioned problems, the present invention provides an information processing apparatus comprising: an obtaining unit configured to obtain a moving image in which each frame is constituted by an image having a plurality of pieces of light field information; and a setting unit configured to set a focus distance for each frame of the moving image, wherein the setting unit displays a range of settable focus distances for each frame of the moving image.

In order to solve the aforementioned problems, the present invention provides a control method of an information processing apparatus, the method comprising: obtaining a moving image in which each frame is constituted by an image having a plurality of pieces of light field information; setting a focus distance for each frame of the moving image; and displaying a range of settable focus distances for each frame of the moving image.

In order to solve the aforementioned problems, the present invention provides a non-transitory computer-readable storage medium storing a program for causing a computer to execute a control method of an information processing apparatus, the method comprising: obtaining a moving image in which each frame is constituted by an image having a plurality of pieces of light field information; setting a focus distance for each frame of the moving image; and displaying a range of settable focus distances for each frame of the moving image.

According to the present invention, a focus distance in a frame at any desired time to be set with ease in a moving image in which an in-focus position can be set as desired in each frame after shooting.

Further features of the present invention will become apparent from the following description of exemplary embodiments (with reference to the attached drawings).

BRIEF DESCRIPTION OF THE DRAWINGS

FIG. 5 is a diagram illustrating an example of the display of a setting area in an application window according to the first embodiment.

FIGS. 6A and 6B are flowcharts illustrating a focus distance setting process carried out by the moving image editing application according to the first embodiment.

FIGS. 7A and 7B are diagrams illustrating example of the display of the setting area when setting the focus distance according to the first embodiment.

FIGS. 8A and 8B are diagrams illustrating example of the display of the setting area when setting the focus distance according to the first embodiment.

FIGS. 10A to 10D are diagrams illustrating an example of the display of a setting area in an application window according to the second embodiment.

FIG. 11 is a diagram illustrating an example of the display of the setting area in the application window according to the second embodiment.

DESCRIPTION OF THE EMBODIMENTS

Embodiments of the present invention will be described in detail below. The following embodiments are merely examples for practicing the present invention. The embodiments should be properly modified or changed depending on various conditions and the structure of an apparatus to which the present invention is applied. The present invention should not be limited to the following embodiments. Also, parts of the embodiments to be described later may be properly combined.

First Embodiment

Hereinafter, an embodiment in which a personal computer ("PC" hereinafter) that edits a moving image shot by a light field camera (a "light field moving image") is applied as an information processing apparatus according to the present invention will be described. Note that the present invention can also be applied in an electronic device such as a smartphone, a tablet terminal, or the like that includes a light field camera.

In the light field moving image, each frame is constituted of a multi-viewpoint image having a plurality of pieces of light field information, and an in-focus position can be set as desired in each frame after the image has been shot.

In the stated light field moving image, the focus distance in a frame can easily be set at a desired time in a GUI (graphical user interface) of a moving image editing application according to the present embodiment.

Apparatus Configuration

First, the configuration of the information processing apparatus according to the present embodiment will be described with reference to FIG. 1.

Figure 1:
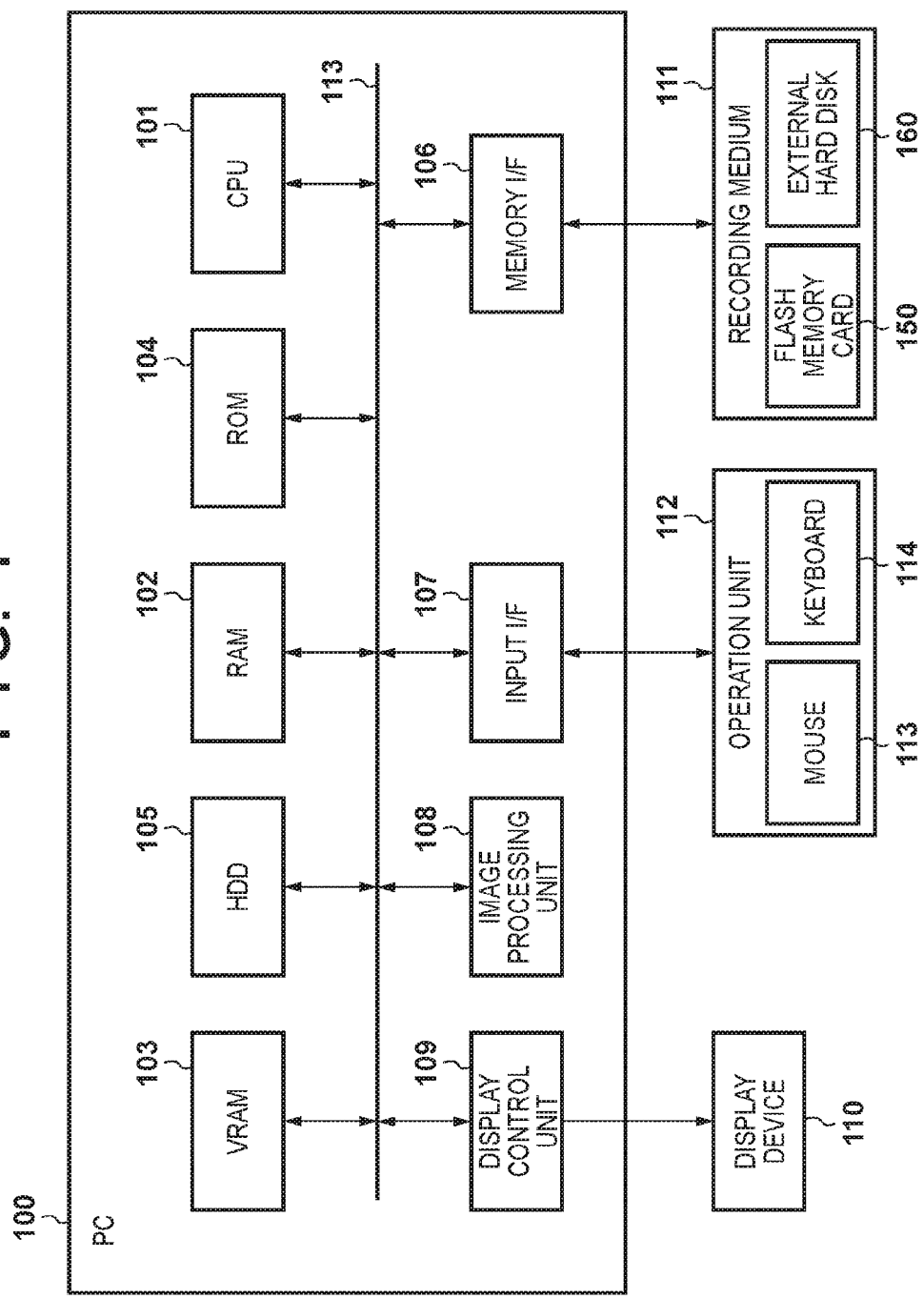
FIG. 1 is a block diagram illustrating the configuration of an information processing apparatus according to an embodiment.

As illustrated in FIG. 1, a PC 100 includes a CPU 101, a RAM 102, a VRAM 103, a ROM 104, an HDD 105, a memory I/F 106, an input I/F 107, an image processing unit 108, a display control unit 109, a display device 110, a recording medium 111, an operation unit 112, and an internal bus 113. The PC 100 may further include an image capturing unit that captures an image, a communication unit that communicates with an external device, and so on. The communication unit has a function for exchanging control signals, image signals, and so on with the external device; the communication method is not particularly limited, and may be wireless LAN, wired LAN, USB, Bluetooth (registered trademark), or the like. Here, the external device may be any type of device, such as a personal computer, a camera, a cellular phone, a smartphone, a hard disk recorder, a game device, a remote controller, or the like, as long as it is a device capable of communicating with the PC 100.

The CPU 101 controls the various function blocks of the PC 100. The RAM 102 is a main memory that stores data. The RAM 102 is primarily used as a storage region for various types of data, such as a region for storing or loading programs executed by the CPU 101, a work region for programs being executed, and so on.

Image data to be displayed in the display device 110 is rendered in the VRAM 103. The image data generated by the VRAM 103 is transferred to the display control unit 109 and an image is then displayed in the display device 110. Note that the VRAM 103 may be the same as the RAM 102 as long as the data transfer speed of the RAM 102 is sufficiently high.

The ROM 104 is used to store various types of programs and data such as a boot program, application programs (such as the moving image editing application described in the present embodiment), an operating system ("OS" hereinafter), and the like.

The hard disk drive ("HDD" hereinafter) 105 is a high-capacity storage device that stores the stated applications, control programs such as the OS, content data such as moving images (including light field moving images, which will be described later) and still images, and so on.

The image processing unit 108 carries out encoding processing, decoding processing, and so on on image data stored in the HDD 105, image displayed in the display device 110, and so on.

The display control unit 109 controls the image data stored in the VRAM 103 to be read out and displayed in the display device 110.

The display device 110 includes a display unit such as a liquid crystal panel, an organic EL panel, or the like, and displays images on the basis of control signals from the display control unit 109. A moving image editing window (see FIG. 2) of the moving image editing application, which will be described later, is also displayed in the display device 110.

The memory I/F 106 controls the reading out and writing of data from and to the recording medium 111, which is a memory card 150, an external hard disk 160, or the like.

The recording medium 111 stores various control programs executed in the PC 100, content, data, and so on.

The input I/F 107 accepts user operations made through the operation unit 112, which is a mouse 113, a keyboard 114, a touch panel provided as part of the display device 110, and so on, and sends control signals to the CPU 101. The CPU 101 accepts the control signals input from the operation unit 112 and controls the various function blocks of the PC 100.

In the PC 100, the touch panel is formed as an integral part of an LCD panel, and is capable of detecting contact made with the display device 110. An input coordinate system of the touch panel is then associated with a display coordinate system of the display device 110. This makes it possible to configure a GUI that makes a user feel as if he or she can actually directly manipulate windows displayed in the display device 110.

The internal bus 113 is connected to the aforementioned function blocks so as to be capable of data communication therewith, and functions as a transmission path for sending various types of data, control information, and so on to the function blocks of the PC 100.

Overview of Moving Image Editing Application

Next, the moving image editing application according to the present embodiment will be described with reference to FIG. 2.

Figure 2:
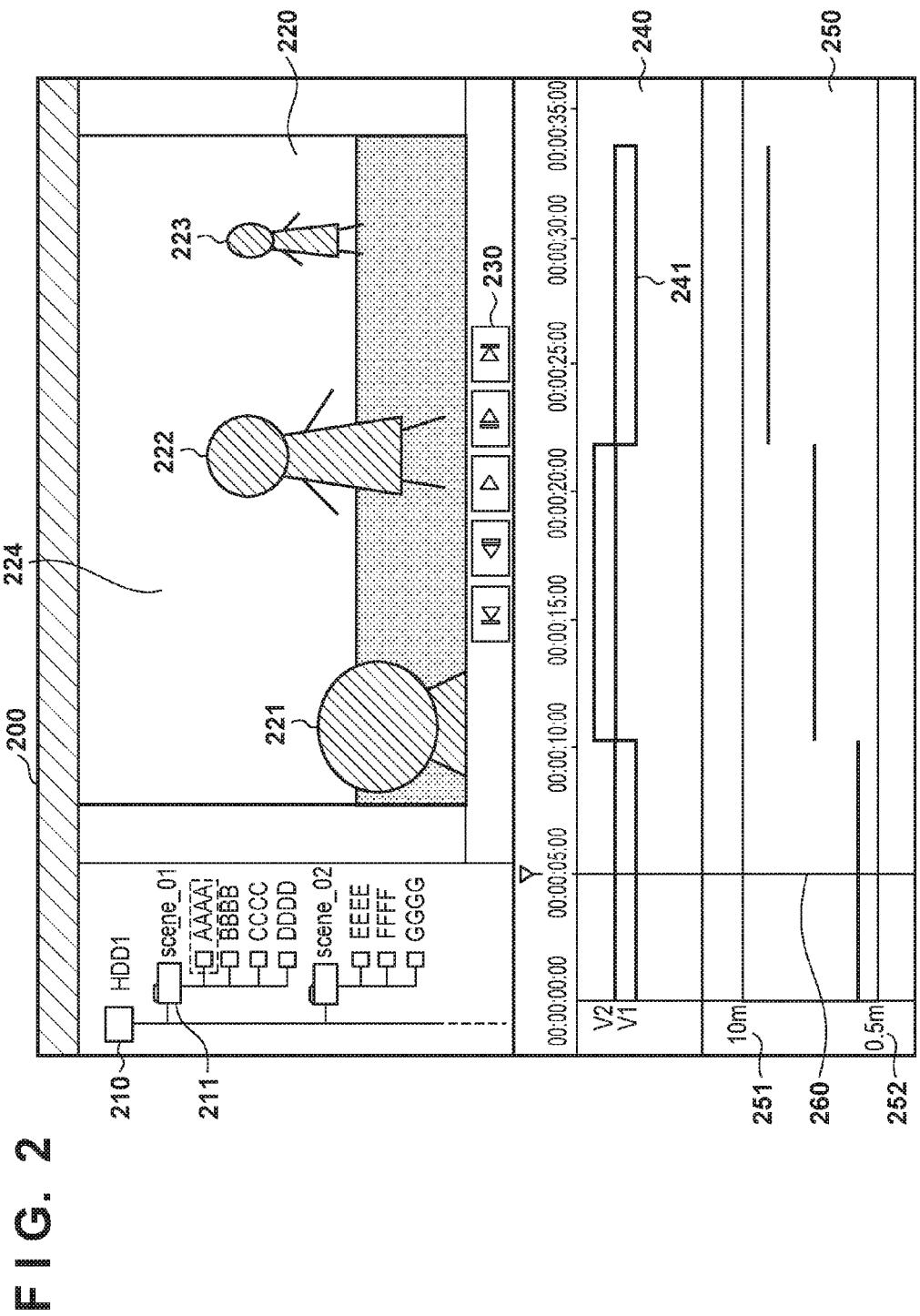
FIG. 2 is a diagram illustrating an overview of a moving image editing application according to the embodiment.

As illustrated in FIG. 2, when the moving image editing application is launched on the PC 100, an application window 200 is displayed in the display device 110. The application window 200 includes a file display area 210 that displays a list of light field moving images read from the HDD 105, the recording medium 111, or the like, moving image files generated through a known compression/encoding method. Icons 211 are provided with names for each of groups that group a plurality of moving images into unit of scene or editing. In FIG. 2, a group "scene_01" contains four moving images (where AAAA, BBBB, CCCC, and DDDD are moving image names). A user carries out cut editing in each of the stated groups. A moving image selected by the user is reproduced and displayed in a preview area 220. In FIG. 2, a light field moving image, in which people 221, 222, and 223 are present toward the front, in the center, and toward the rear, respectively, and a wall 224 is present in the background, is displayed in the preview area 220. Control buttons 230 serve as a GUI for making operations such as starting and stopping (pausing) the reproduction of the moving image being displayed in the preview area 220, fast-forwarding and reversing the moving image, and so on. A timeline area 240 serves as a GUI for displaying a reproduction timing 241 indicating a reproduction order, reproduction segments, and so on of the frames in the moving image read from the HDD 105, the recording medium 111, or the like. To add a moving image to the timeline 240, a moving image icon 211 displayed in the file display area 210 can be dragged and dropped into the timeline 240. Furthermore, the reproduction timing after a moving image has been added to the timeline area 240 can be changed by dragging the timeline area 240. A GUI for setting and displaying a focus distance for each frame in the moving image is displayed in a setting area 250. The setting area 250 is a region in which a distance to an in-focus position (an object) is represented by a vertical axis and a recording time is represented by a horizontal axis, and the focus distance can be set and displayed for each frame of the moving image in association with the reproduction timing of the moving image added to the timeline 240. Note that a maximum distance (10 m) 251 and a minimum distance (0.5 m) 252 at which an object in the moving image added to the timeline 240 can be focused on are displayed on the vertical axis of the setting area 250. In FIG. 2, a focus distance from 0.5 m to 10 m can be set as the focusable distance. Details of operations for setting the focus distance in the setting area 250 will be given later. A bar 260 is an indicator that indicates a current reproduction position in the timeline area 240.

The focusable distance may differ depending on the moving image, and the design may be such that a focusable range is displayed differently depending on the moving image.

As will be described later, the focusable distance for each moving image is recorded in a header portion of the moving image file; on the basis of this information, the UI illustrated in FIG. 2 is constructed and a user-settable focus distance range is displayed.

File Structure

Next, the file structure of a light field moving image 300, which is a subject of editing according to the present embodiment, will be described with reference to FIG. 3.

Figure 3:
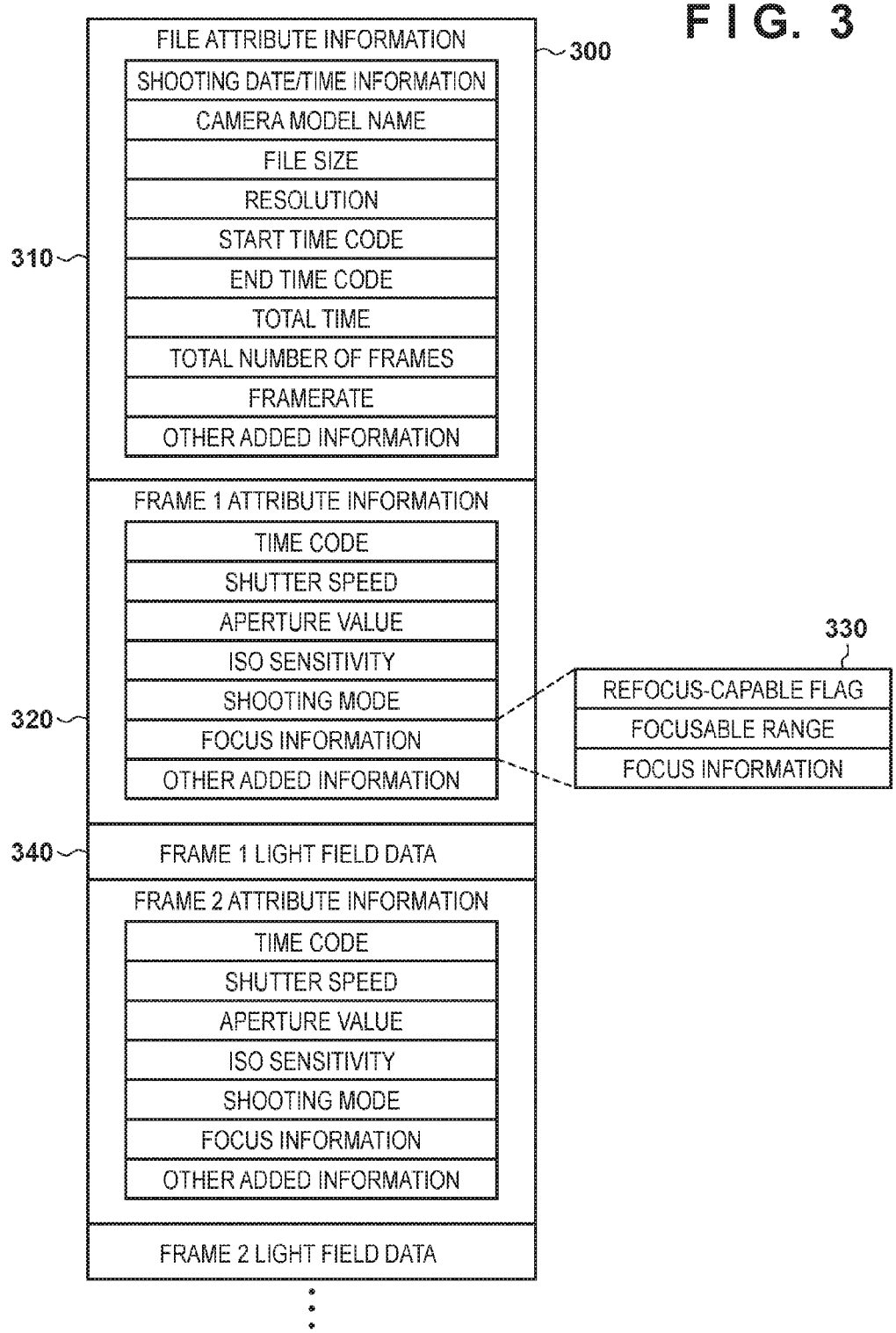
FIG. 3 is a diagram illustrating the file structure of a light field moving image, which is a subject of editing according to the embodiment.

As illustrated in FIG. 3, the light field moving image file 300 includes a header portion 310 in which is recorded attribute information regarding the file, a header portion 320 in which is recorded attribute information regarding a frame, and an image data portion 340 in which is recorded one frame's worth of image data. For example, shooting date/time information, a camera model name, a file size of the moving image, a resolution of the moving image, a start time code, an end time code, a total time of the moving image, a total number of frames, a frame rate, and other added information are recorded in the header portion 310 as the moving image file attribute information. For example, a time code, a shutter speed, an aperture value, an ISO sensitivity, a shooting mode, focus information, and other added information for frame 1 are recorded in the header portion 320 as attribute information for one frame (a first frame 1, in FIG. 3). Focus information 330 includes a refocus-capable flag, a focusable range, and focus information. The refocus-capable flag is a flag indicating whether or not the one frame's worth of data recorded in the image data portion 340, which will be mentioned later, is light field data. The focusable range indicates the maximum value and the minimum value for the focusable distance for each frame. The maximum value and the minimum value are determined by the lens configuration of the video camera that shot the light field moving image. The focus distance is recorded in the focus information. Note that a focus distance obtained by the autofocus function of a normal video camera instead of a light field camera capable of shooting light field moving images may be substituted for the focusable distance, or the focusable distance may be a focus distance set as desired by the user. Meanwhile, a plurality of focus distances, a range of focus distance such as 1 m-2 m, or the like may be recorded in the focus information. Furthermore, information aside from the focus distance may be recorded in the focus information. For example, it is possible to record only coordinates in the image data as the focus information, or a depth map obtained through a known method may be recorded into another region of the header portion. In this case, the focus distance can be obtained by referring to coordinates in the depth map. One frame's worth of light field data is recorded in the image data portion 340, and as illustrated in FIG. 3, the header portions 310 and 320 and the image data portion 340 are each recorded in the second (frame 2) and subsequent frames in the same manner as for the first frame (frame 1).

Moving Image Editing Process

Next, a light field moving image focus distance setting process performed by the moving image editing application running on the PC 100 according to the present embodiment will be described with reference to FIGS. 4 to 8B.

Figure 4:
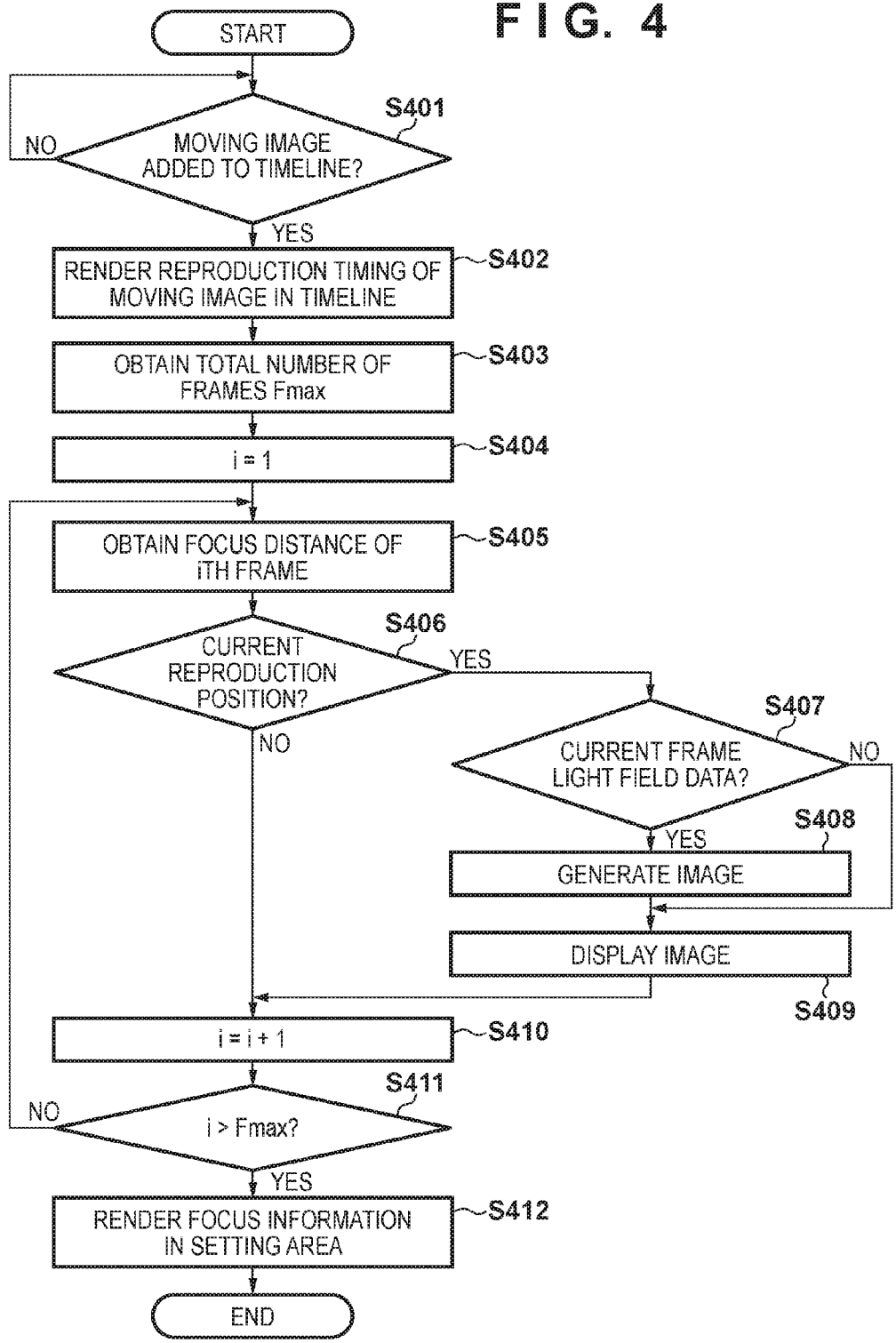
FIG. 4 is a flowchart illustrating processing performed by a moving image editing application according to a first embodiment.

FIG. 4 is a flowchart illustrating processing performed by the moving image editing application up until the focus information set in the light field moving image added to the timeline 240 illustrated in FIG. 3 is displayed in the setting area 250. This processing is realized by the CPU 101 loading a program stored in the ROM 104 into the RAM 102 and executing the program so as to control the various units.

In step S401, the CPU 101 determines whether or not a moving image in the file display area 210 has been added to the timeline 240. In the case where a result of the determination indicates that a moving image has been added, the process advances to step S402; however, in the case where a moving image has not been added, the process returns to step S401 and stands by until a moving image is added to the timeline. The following assumes that a light field moving image read from the HDD 105, the recording medium 111, or the like has been added to the timeline 240 of the moving image editing application window 200 illustrated in FIG. 3.

In step S402, the CPU 101 obtains information such as the total time, the frame rate, and so on of the moving image from the attribute information of the moving image added in step S401, and then renders the reproduction timing of the moving image on the timeline 240 in accordance with the current settings of the timeline 240.

In step S403, the CPU 101 obtains a total number of frames Fmax of the moving image from the attribute information of the moving image.

In step S404, the CPU 101 sets a variable i, for counting the number of frames, to i=1.

In step S405, the CPU 101 obtains the focus distance of an ith frame from the focus information in the attribute information of the moving image, and stores that focus distance in the RAM 102 along with a frame number of the frame.

In step S406, the CPU 101 determines whether or not the position of the ith frame matches the current reproduction position in the timeline 240. In the case where a result of the determination indicates a match, the process advances to step S407, whereas in the case where there is no match, the process advances to step S410.

In step S407, the CPU 101 determines whether or not the ith frame is light field data by referring to the refocus-capable flag of the ith frame in the focus information included in the attribute information of the moving image. In the case where a result of the determination indicates that the ith frame is light field data, the process advances to step S408, whereas in the case where the ith frame is not light field data, the process advances to step S409.

In step S408, the CPU 101 generates an image focused at the focus distance obtained in step S405, from the light field data stored in the image data portion 340 of the ith frame. A variety of processes exist for generating an image focused at a specific distance from light field data, but as this is not a feature of the present invention, detailed descriptions thereof will be omitted.

In step S409, the CPU 101 displays the image of the ith frame in the preview area 220.

In step S410, the CPU 101 increments i by 1.

In step S411, the CPU 101 determines whether or not i is greater than Fmax. In the case where a result of the determination indicates that i is greater than Fmax, the process advances to step S412, whereas in the case where i is less than or equal to Fmax, the process moves to step S405.

In step S412, the CPU 101 renders the Fmax focus distances stored in the RAM 102 in the setting area 250, and the process then ends. FIG. 5 is an example of the display in the setting area 250 when actually rendering the focus distances of the frames of a moving image. Here, it is assumed that the frames corresponding to moving image segments 1, 2, and 3 arranged on the timeline 240 were shot while focusing on the people 221, 222, and 223, respectively, illustrated in FIG. 2. Meanwhile, it is assumed that the camera and the people 221, 222, and 223 are still when the moving image is shot. Furthermore, it is assumed that the distances from a lens surface of the camera to the people 221, 222, and 223 are L1m, L2m, and L3m, respectively. The focus distances in the frames of segments 1, 2, and 3 are fixed at L1m, L2m, and L3m, respectively, and thus in the setting area 250, lines are rendered against segments 1, 2, and 3 along the time axis at the positions of L1m, L2m, and L3m, respectively. The dotted lines in FIG. 5 are assistive lines for making the descriptions more comprehensible, and are not actually displayed in the setting area 250 of the application window 200.

Note that in addition to light field moving images, moving image files generated through existing compression/encoding methods have a total number of frames for the moving image, the focus distances for each frame, and so on stored in a predetermined region in the same manner as the light field moving images according to the present embodiment, and thus this processing can be applied thereto as well.

FIGS. 6A and 6B illustrate processing performed by the moving image editing application when a user sets the focus distance from the state illustrated in FIG. 5.

In step S601 of FIG. 6A, the CPU 101 determines whether or not the user has clicked in a segment of frames in the setting area 250. In the case where a result of the determination indicates that a segment has been clicked, the process advances to step S602, whereas in the case where a segment has not been clicked, the process returns to step S601 and stands by until the user clicks in the setting area 250. The following assumes that the user has clicked in segment 1 illustrated in FIG. 5.

In step S602, the CPU 101 obtains a frame number F and a vertical axis value L of the position where the click was made in the moving image of segment 1. The vertical axis value L serves as the focus distance set for the Fth frame. The obtained frame number and vertical axis value are stored in the RAM 102 in association with each other. Hereinafter, the position where the user clicked in the setting area 250 will be called a "node", and a dot is displayed in the node position.

In step S603, the CPU 101 obtains, from the RAM 102, the position of a node that is, in segment 1, adjacent in the horizontal axis direction to the node set in step S602. Next, for the two obtained nodes, a frame number Fa of the moving image of the node on the left side and a focus distance La of that frame, and a frame number Fb of the moving image of the node on the right side and a focus distance Lb of that frame, are respectively obtained. FIG. 7A is an example of the display in the case where the user has clicked in the setting area 250 in step S601. In FIG. 7A, 710 indicates the node set in step S602. The node 710 is present in a position of segment 1 corresponding to the frame number F and a focus distance L of L2. FIG. 7A illustrates a state where the user has only designated the node 710 in segment 1. In this case, there is no node adjacent to the node 710, and thus a point 720 at a left end of segment 1 and a point 730 at a right end of segment 1 are used as nodes adjacent to the node 710. In FIG. 7A, Fa=1, La=L1, Fb=Fmax, and Lb=L1. Note that in the case where the user has clicked the position of the left end of segment 1, there is no adjacent node to the left of the set node, and thus the set node and the node adjacent to the left thereof are treated as the same node. In other words, Fa=F and La=L. Likewise, Fb=F and Lb=L in the case where the user has clicked the position of the right end of segment 1. In the case where the user has clicked a frame position where a node is already present, that existing node is deleted and a node is newly displayed at the position that was clicked.

In step S604, the CPU 101 calculates the focus distance for each frame in segment 1 and stores those focus distances with the frame numbers in the RAM 102. The calculated focus distances may be stored in a region of the focus information for the corresponding frames in the attribute information of the light field moving image. Details of this process will be given later.

In step S605, the CPU 101 renders the Fmax focus distances stored in the RAM 102 in the setting area 250, and the process then ends.

FIG. 6B illustrates the focus distance calculation process carried out in step S604 of FIG. 6A.

In step S611 of FIG. 6B, the CPU 101 sets the variable i, for counting the number of frames, to i=Fa.

In step S612, the CPU 101 calculates a focus distance Li of the ith frame through Formula 1, from the focus information in the attribute information of the moving image of segment 1.

$$Li=(L-La)/(F-Fa)\times(i-Fa)+La \quad (1)$$

The obtained focus distance is stored in the RAM 102 along with the frame number.

In step S613, the CPU 101 determines whether or not the position of the ith frame matches the current reproduction position in the timeline 240. In the case where a result of the determination indicates a match, the process advances to step S614, whereas in the case where there is no match, the process advances to step S616.

In step S614, the CPU 101 generates an image focused at the focus distance calculated in step S612, from the light field data stored in the image data portion 340 of the ith frame.

In step S615, the CPU 101 displays the image of the ith frame in the preview area 220.

In step S616, the CPU 101 increments i by 1.

In step S617, the CPU 101 determines whether or not i is greater than F. In the case where a result of the determination indicates that i is greater than F, the process advances to step S618, whereas in the case where i is less than or equal to F, the process moves to step S611.

In step S618, the CPU 101 calculates the focus distance L1 of the ith frame through Formula 2, from the focus information in the attribute information of the moving image of segment 1.

$$Li=(Lb-L)/(Fb-F)\times(i-F)+L \quad (2)$$

The obtained focus distance is stored in the RAM 102 along with the frame number.

Steps S619 to S622 are the same as steps S613 to S616.

In step S623, the CPU 101 determines whether or not i is greater than Fb. In the case where a result of the determination indicates that i is greater than Fb, the process ends, whereas in the case where i is less than or equal to Fb, the process moves to step S618.

FIG. 7B is an example of the display in the setting area 250 after the process of step S605. In the case where segment 1 is reproduced by the application window 200, the CPU 101 generates, for the light field data in the frame at the reproduction position, an image that is focused at the focus distance for that frame, obtained from the RAM 102, and displays the image in the preview area 220. Rather than generating an image at each reproduction, an image may be generated for each frame before reproduction, and that image data may be stored in the RAM 102, the HDD 105, or the like. When segment 1 in FIG. 7B is reproduced, a moving image in which the focus shifts from the person 221, to the person 222, and back to the person 221 in that order is displayed in the preview area 220.

Note that the lines, nodes, and so on rendered in the setting area 250 are assumed to have been accepted through a dragging operation made by the user. In the case where a line has been dragged, display control is carried out so that the line moves in the setting area 250 while holding the line shape, and when the dragging operation stops, the vertical axis values of each frame are obtained as the focus distances of those frames. Meanwhile, in the case where a node has been dragged, display control is carried out so that lines connected to the dragged node follow the node that moves, and when the dragging operation stops, the vertical axis values of each frame are obtained as the focus distances of those frames. FIG. 8A is an example of the display in the case where the line of segment 1 rendered in the setting area 250 has been dragged in the vertical direction relative to the horizontal axis. FIG. 8B, meanwhile, is an example of the display in the case where the node 710 rendered in the setting area 250 has been dragged in the vertical direction relative to the horizontal axis. The nodes in the setting area 250 may be displayed at a certain size in order to make them easier for the user to manipulate.

As described thus far, according to the present embodiment, the focus distance of a frame can easily be set at a desired time in a light field moving image in which the in-focus position of each frame can be set as desired after the moving image has been shot. Furthermore, changes in the in-focus position as time passes in the moving image can be visually confirmed.

Second Embodiment

Next, a moving image editing process according to a second embodiment will be described.

The first embodiment describes a configuration in which a single focus distance can be set for each frame in the setting area 250, a change in the in-focus position is rendered as a single polygonal line, and an image focused at the set in-focus position is generated. As opposed to this, the present embodiment describes a configuration in which two focus distances can be set for each frame, and a range can be set for the focus distance.

Note that processes that are the same as those in the first embodiment will be assigned the same reference numerals and descriptions thereof will be omitted. Furthermore, the PC configuration, moving image editing application overview, and file structure of the light field moving image according to the present embodiment are the same as those described in the first embodiment with reference to FIGS. 1, 2, and 3, respectively, and thus descriptions thereof will be omitted.

Figure 9A:
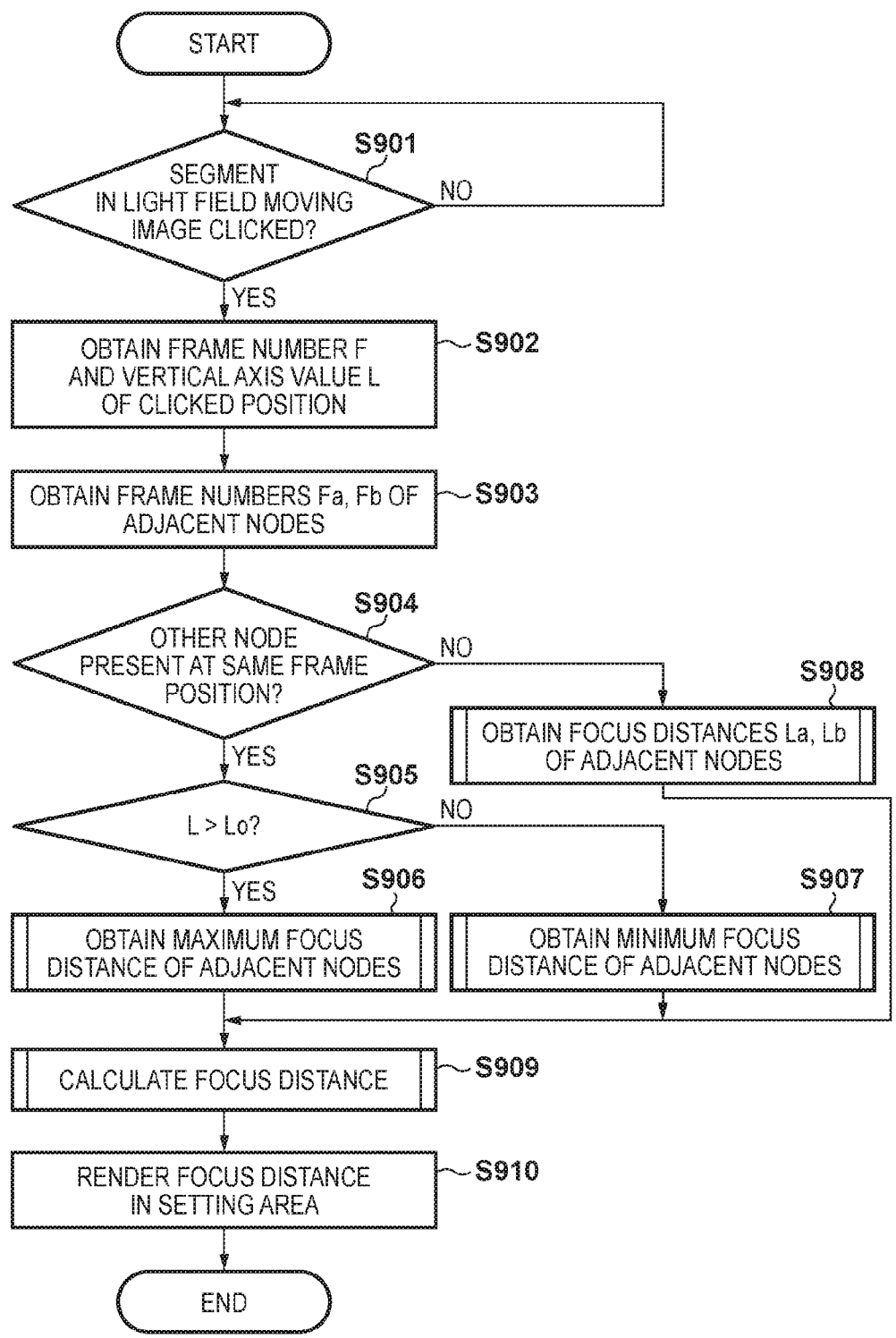
FIGS. 9A to 9C are flowcharts illustrating a focus distance setting process carried out by a moving image editing application according to a second embodiment.
Figure 9B:
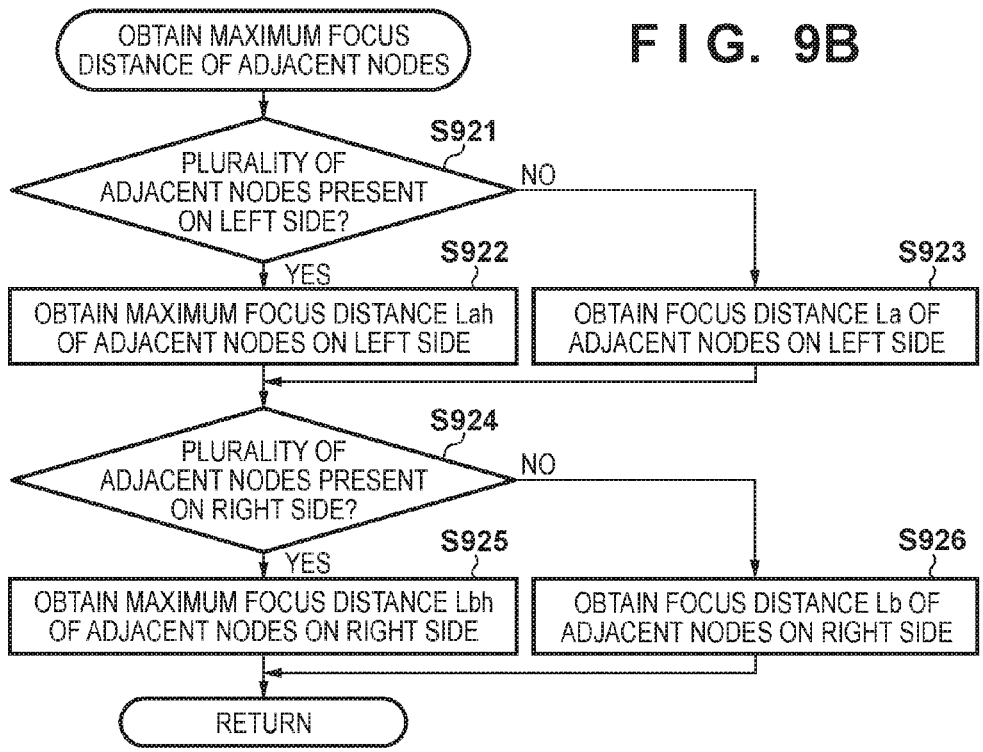
Figure 9C:
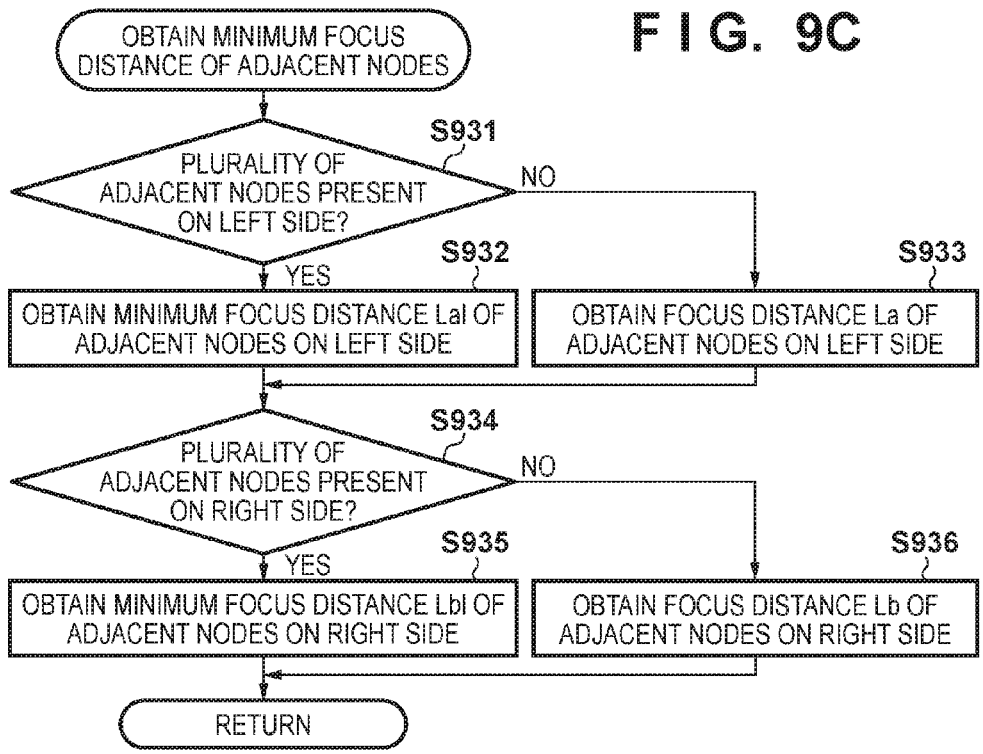

FIGS. 9A to 9C illustrated processing performed by the moving image editing application according to the present embodiment, and assume that the setting area 250 is displayed as illustrated in FIG. 7B.

In step S901 of FIGS. 9A to 9C, the CPU 101 determines whether or not the user has clicked in a segment of frames in the setting area 250. In the case where a result of the determination indicates that a segment has been clicked, the process advances to step S902, whereas in the case where a segment has not been clicked, the process returns to step S901 and stands by until the user clicks in the setting area 250. The following assumes that the user has clicked the same frame position as the node 710 by with a different vertical axis value.

Figure 10A:
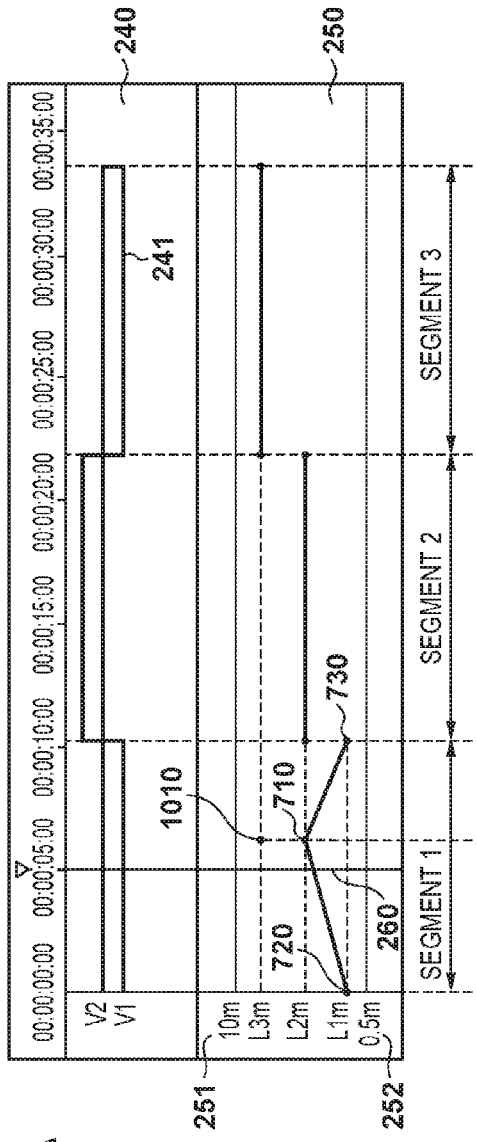

FIG. 10A is an example of the display in the case where the user has clicked the position of a frame number F and a vertical axis value L3 in the setting area 250. In the first embodiment, in the case where the user has clicked a frame position where a node is already present, that existing node is deleted and a node is newly displayed at the position that was clicked. As opposed to this, in the present embodiment, up to two nodes can be displayed at the same frame position. In the case where the user has clicked a frame position where two nodes are already present, the node closest to the clicked position is deleted and a node is displayed at the clicked position. FIG. 10A illustrates a node 1010 that has been newly added by the most recent click operation made by the user.

In step S902, the CPU 101 obtains the frame number F and the vertical axis value L at the position clicked in the frames of segment 1 and stores that information in the RAM 102.

In step S903, the CPU 101 obtains, from the RAM 102, the position of a node that is, in segment 1, adjacent in the horizontal axis direction to the node set in step S902. Next, for the two obtained nodes, the frame number Fa of the moving image at the node on the left side and the frame number Fb of the moving image at the node on the right side are obtained. In the example illustrated in FIG. 10A, Fa=1 and Fb=Fmax.

In step S904, the CPU 101 determines whether or not another node is present at the same frame position as the position clicked in step S901. In the case where a result of the determination indicates a node is present, the process advances to step S905, whereas in the case where no node is present, the process advances to step S908.

In step S905, the CPU 101 compares a focus distance Lo at the other node present at the same frame position with the vertical axis value L. In the case where a result of the comparison indicates that the value L is greater than the focus distance Lo, the process advances to step S906, whereas in the case where the value L is less than or equal to the focus distance Lo, the process advances to step S907.

In step S906, in the case where a plurality of adjacent nodes in the horizontal axis direction are present at the same frame position, the CPU 101 obtains the focus distance at the node having the greater focus distance ("maximum focus distance" hereinafter). Details of this process will be given later.

In step S907, in the case where a plurality of adjacent nodes in the horizontal axis direction are present at the same frame position, the CPU 101 obtains the focus distance at the node having the smaller focus distance ("minimum focus distance" hereinafter). Details of this process will be given later.

In step S908, for the two adjacent nodes obtained in step S903, the CPU 101 obtains the focus distance La at the node on the left side and the focus distance Lb at the node on the right side.

In step S909, the CPU 101 calculates the focus distance of each frame of the moving image in segment 1 using the frame numbers and focus distances at the nodes adjacent in the horizontal axis direction obtained in steps S906 to S0908. The focus distance calculation process is the same as that described in the first embodiment with reference to FIG. 6B.

In step S910, the CPU 101 renders the Fmax focus distances stored in the RAM 102 in the setting area 250, and the process then ends.

FIG. 9B illustrates the process of obtaining the maximum focus distance of the nodes adjacent in the horizontal axis direction indicated in step S906 of FIG. 9A.

In step S921 of FIG. 9B, the CPU 101 determines whether or not a plurality of adjacent nodes are present on the left side. In the case where a result of the determination indicates a plurality of nodes are present, the process advances to step S922, whereas in the case where a plurality of nodes are not present, the process advances to step S923.

In step S922, the CPU 101 obtains a maximum focus distance Lah of the adjacent nodes on the left side.

In step S923, the CPU 101 obtains the focus distance La of the adjacent nodes on the left side.

In step S924, the CPU 101 determines whether or not a plurality of adjacent nodes are present on the right side. In the case where a result of the determination indicates a plurality of nodes are present, the process advances to step S925, whereas in the case where a plurality of nodes are not present, the process advances to step S926.

In step S925, the CPU 101 obtains a maximum focus distance Lbh of the adjacent nodes on the right side, and the process ends.

In step S926, the CPU 101 obtains the focus distance Lb of the adjacent nodes on the right side, and the process ends.

FIG. 9C illustrates the process of obtaining the minimum focus distance of the nodes adjacent in the horizontal axis direction indicated in step S907 of FIG. 9A.

In step S931 of FIG. 9C, the CPU 101 determines whether or not a plurality of adjacent nodes are present on the left side. In the case where a result of the determination indicates a plurality of nodes are present, the process advances to step S932, whereas in the case where a plurality of nodes are not present, the process advances to step S933.

In step S932, the CPU 101 obtains a minimum focus distance Lal of the adjacent nodes on the left side.

In step S933, the CPU 101 obtains the focus distance La of the adjacent nodes on the left side.

In step S934, the CPU 101 determines whether or not a plurality of adjacent nodes are present on the right side. In the case where a result of the determination indicates a plurality of nodes are present, the process advances to step S935, whereas in the case where a plurality of nodes are not present, the process advances to step S936.

In step S935, the CPU 101 obtains a minimum focus distance Lbl of the adjacent nodes on the right side, and the process ends.

In step S936, the CPU 101 obtains the focus distance Lb of the adjacent nodes on the right side, and the process ends.

Figure 10B:
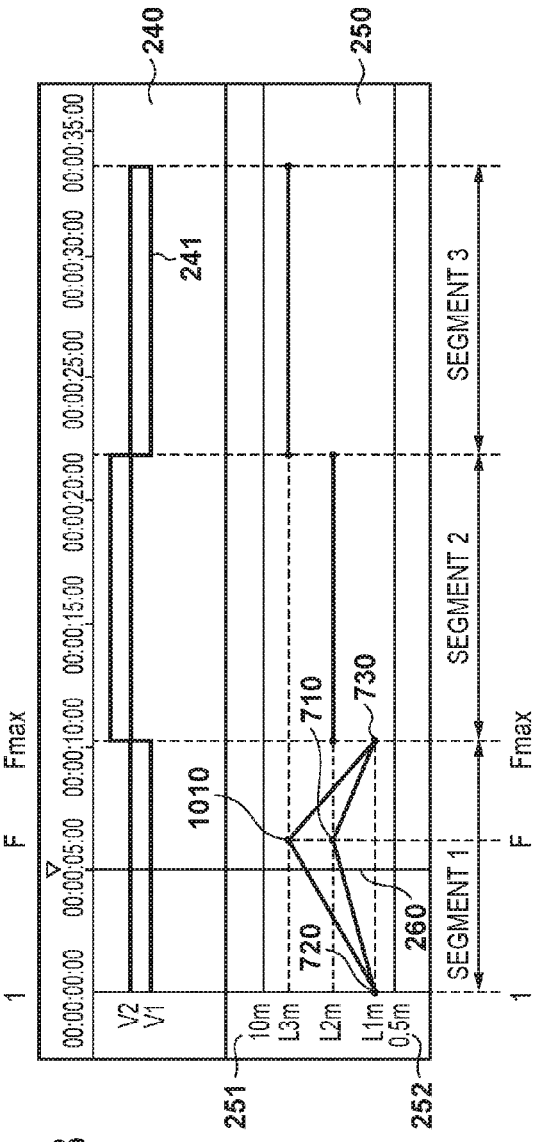

FIG. 10B is an example of the display in the setting area 250 after the process of step S910. As illustrated in FIG. 10B, a focus distance range for each frame can be represented by two polygonal lines in the setting area 250. In FIG. 10B, when the bar 260 indicating the reproduction position has reached the position of the frame number F, an image focused between the person 222 and the person 223 is displayed in the preview area 220. Hereinafter, of the two lines, a line connected to nodes having the maximum focus distance will be called a maximum focus distance line, and a line connected to nodes having the minimum focus distance will be called a minimum focus distance line.

As illustrated in FIG. 10C, the processes of FIGS. 9A to 9C can also be applied in the case where the user has clicked a position indicated by 1020 in a state where the maximum focus distance line and the minimum focus distance line are already rendered in the setting area 250. Here, in the case where a node 1020 has been added in step S902, the processes of FIGS. 9A to 9C can be applied by setting a node 1030 on the minimum focus distance line a frame position F1 of the node 1020.

Like the first embodiment, the maximum focus distance line and the minimum focus distance line rendered in the setting area 250 can be dragged by the user independent from each other. With respect to the dragging of the nodes, display control is carried out so that in the case where a plurality of nodes are present at the same frame position, both of the frame positions consistently match. For example, in FIG. 10D, when a node 1040 is dragged to the position indicated by 1060, a node 1050 follows the movement of the node 1040 along the shape of the minimum focus distance line.

As described thus far, according to the present embodiment, in a light field moving image in which the in-focus position can be set as desired in each frame after the image has been shot, a plurality of focus distances can be set for the frames at desired times, which makes it possible to set a range for the in-focus position. Furthermore, changes in the in-focus position range as time passes in the moving image can be visually confirmed.

Although the focus distance range is expressed in the setting area 250 using polygonal lines in the present embodiment, the focus distance range may be represented by a curve using a technique such as spline interpolation instead of polygonal lines. The focus distance range may be displayed in any format as long as the format enables the focus distance range to be visually confirmed in the setting area 250; instead of a line display, a color of the focus distance range may be changed, a predetermined graphic such as an arrow may be rendered in the focus distance range in an identifiable manner, and so on.

Meanwhile, in the application window 200, an image to be displayed in the preview area 220 cannot be generated in the case where a light field moving image in which the focus distance is not stored in the focus information of the attribute information has been added to the timeline 240. In such a case, a pan-focus image of each frame may be generated and displayed as an initial display. An image focused at a distance set in the application window 200 in advance, an image focused on a main object in the moving image, or the like, for example, may be displayed as well.

In addition, in the setting area 250, the maximum value 251 and the minimum value 252 on the vertical axis may be variable within a range over which the light field data can be focused. For example, in FIG. 2, if the maximum value 251 is set from 10 m to 5 m and the minimum value 252 is set from 0.5 m to 1 m, the focus distance per unit length in the vertical axis increases in the setting area 250, which enables the user to set the focus range at finer intervals.

Meanwhile, in the case where a depth map is stored for each frame in the attribute information of the light field moving image and a specific object has been designated by clicking in the preview area 220, the distance to that object may be obtained from the depth map and displayed in the setting area 250. This enables the user to confirm the focus distance to the object to be focused on in the setting area 250.

In addition, in the case where a maximum depth distance in the depth map is compared with the vertical axis maximum value 251 in the setting area 250 and the maximum value 251 is greater, it is possible that an image not in focus anywhere in the screen will be generated. For example, assuming the distance from the camera lens surface to the wall 224 is 9 m in FIG. 2, there is no focusable object present in a range from 9 m to the maximum focusable distance of 10 m. Accordingly, if a range from 9 m to 10 m is set as the focus range in the setting area 250, an image not in focus anywhere in the screen will be generated. In this case, the maximum depth distance in the depth map may be compared with the vertical axis maximum value 251 in the setting area 250 and the user may be warned about frames in which the vertical axis maximum value 251 is greater, as indicated in FIG. 11. An image not in focus anywhere in the screen can be prevented from being generated by making it impossible to set the focus range in a hatched region 1110 illustrated in FIG. 11.

In addition, in the process for generating an image of a frame in a light field moving image in which the focus distance has been changed, the moving image editing application according to the present embodiment may be provided with a function for generating a moving image file in a different format by applying a known compression/encoding method such as H.264. Although the focus range cannot be changed in moving image data generated in this manner, such moving image data can be viewed using a typical moving image player.

Other Embodiments

Embodiments of the present invention can also be realized by a computer of a system or apparatus that reads out and executes computer executable instructions (e. g., one or more programs) recorded on a storage medium (which may also be referred to more fully as a 'non-transitory computer-readable storage medium') to perform the functions of one or more of the above-described embodiments and/or that includes one or more circuits (e. g., application specific integrated circuit (ASIC)) for performing the functions of one or more of the above-described embodiments, and by a method performed by the computer of the system or apparatus by, for example, reading out and executing the computer executable instructions from the storage medium to perform the functions of one or more of the above-described embodiments and/or controlling the one or more circuits to perform the functions of one or more of the above-described embodiments. The computer may comprise one or more processors (e. g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2015-011684, filed Jan. 23, 2015 which is hereby incorporated by reference herein in its entirety.

What is claimed is:

1. An information processing apparatus comprising:
an obtaining unit configured to obtain a moving image in which each frame is constituted by an image having a plurality of pieces of light field information; and
a setting unit configured to set a focus distance for each frame of the moving image,
wherein the setting unit displays a range of settable focus distances for each frame of the moving image.

2. The apparatus according to claim 1, further comprising:
a generating unit configured to generate an image in which a focus distance of the image of each frame in the moving image has been changed to the focus distance set by the setting unit; and
a display control unit configured to display the image generated by the generating unit in a display unit.

3. The apparatus according to claim 1, wherein
the setting unit displays a setting area constituted of a focus distance range for each frame in the moving image and a time axis; and
the setting area can accept a user operation for setting the focus distance.

4. The apparatus according to claim 3, wherein
the setting unit displays the focus distance set for each frame of the moving image and a focus distance from when the image of each frame was shot in the setting area so as to be identifiable.

5. The apparatus according to claim 3, wherein
the setting unit displays a maximum value and a minimum value of the focus distances that can be set by the setting unit in the setting area along a time axis; and
a focus distance from when the image of each frame of the moving image was shot is displayed in the setting area on a frame-by-frame basis along the time axis.

6. The apparatus according to claim 3, wherein
the setting unit can set the focus distance at at least one point in each frame of the moving image, and displays, in the setting area, a line connecting a focus distance from when the image of each frame of the moving image was shot to the focus distance, set by the setting unit, that is adjacent to that focus distance.

7. The apparatus according to claim 5, wherein
the setting unit can change the maximum value and the minimum value within the focus distance range that can be set by the setting unit; and
the setting unit displays the changed maximum value and minimum value of the focus distance in the setting area.

8. The apparatus according to claim 5, wherein
the setting unit compares a maximum depth distance with the maximum value for each frame in the moving image, and in the case where the maximum value is higher, displays a range for which the focus distance cannot be set in the setting area.

9. The apparatus according to claim 3, further comprising a designating unit configured to designate an object from the image in each frame of the moving image,
wherein the setting unit displays the focus distance of the object designated by the designating unit for each frame of the moving image in the setting area.

10. The apparatus according to claim 2, wherein
the generating unit generates, from the image whose focus distance has been changed by the setting unit, an image in a format different from the moving image obtained by the obtaining unit.

11. A control method of an information processing apparatus, the method comprising:
- obtaining a moving image in which each frame is constituted by an image having a plurality of pieces of light field information;
- setting a focus distance for each frame of the moving image; and
- displaying a range of settable focus distances for each frame of the moving image.

12. A non-transitory computer-readable storage medium storing a program for causing a computer to execute a control method of an information processing apparatus, the method comprising:
- obtaining a moving image in which each frame is constituted by an image having a plurality of pieces of light field information;
- setting a focus distance for each frame of the moving image; and
- displaying a range of settable focus distances for each frame of the moving image.

* * * * *